June 25, 1940.     D. HEYER     2,205,975
VENTILATED VARIABLE SPEED POWER UNIT
Filed Feb. 19, 1934     5 Sheets-Sheet 1

Don Heyer  INVENTOR
BY  John Flam
ATTORNEY

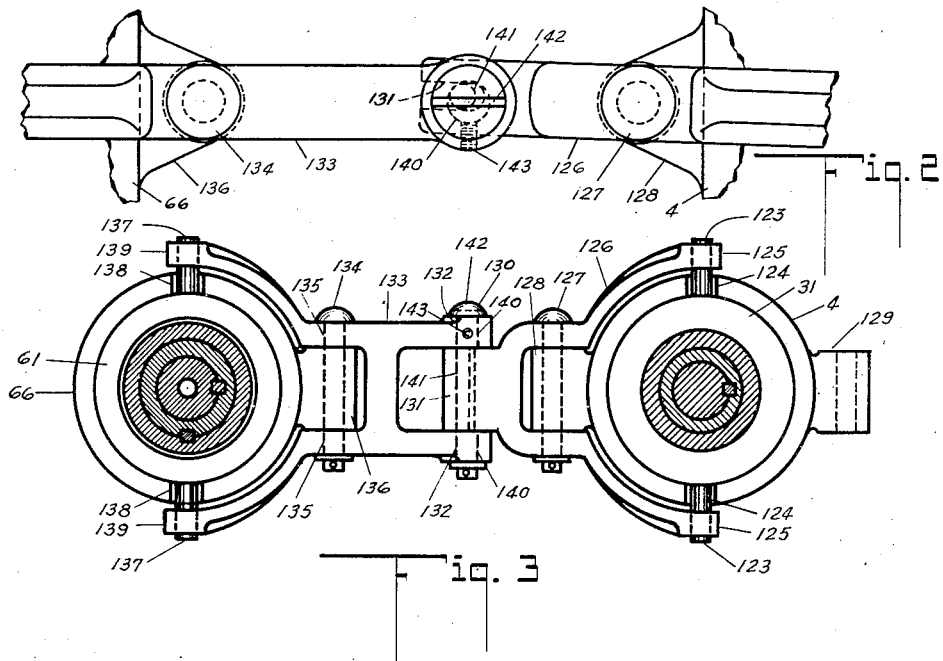
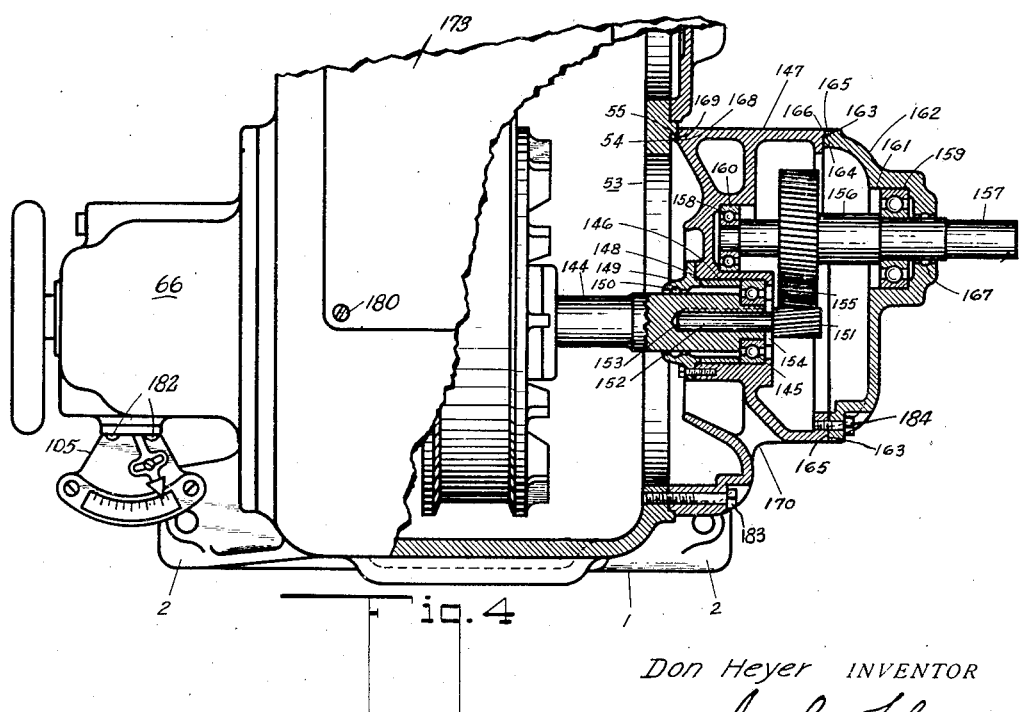

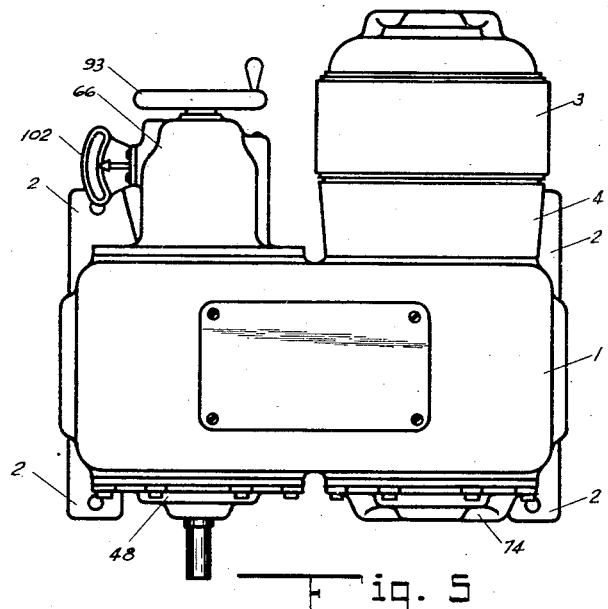
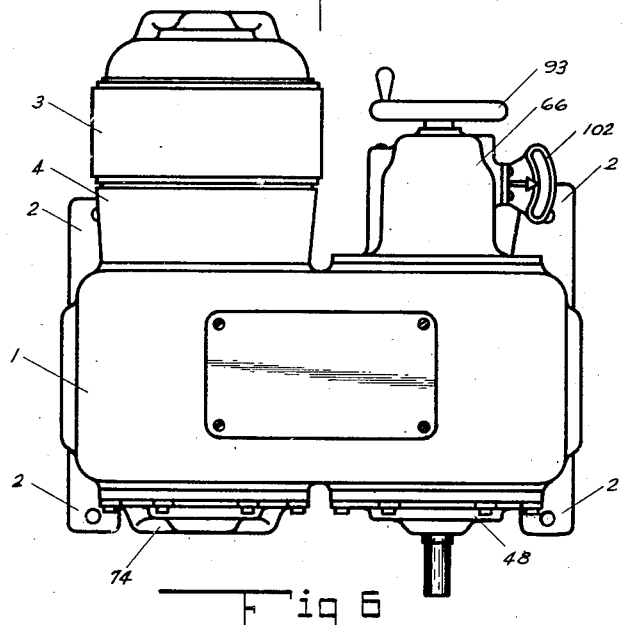

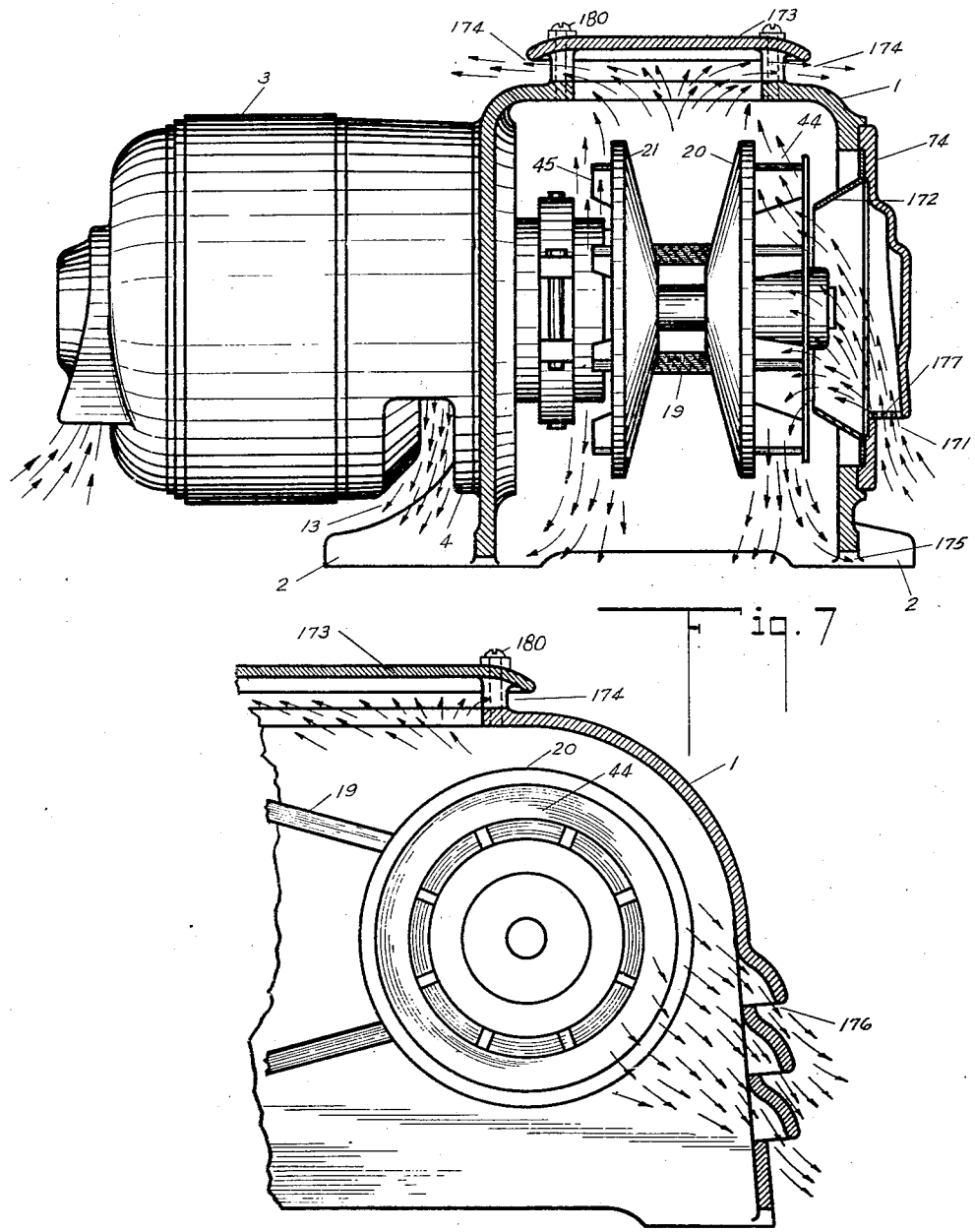

June 25, 1940.　　　　　D. HEYER　　　　　2,205,975
VENTILATED VARIABLE SPEED POWER UNIT
Filed Feb. 19, 1934　　　5 Sheets-Sheet 5

Don Heyer　INVENTOR
BY John Flam
ATTORNEY

Patented June 25, 1940

2,205,975

UNITED STATES PATENT OFFICE 2,205,975

VENTILATED VARIABLE SPEED POWER UNIT

Don Heyer, Los Angeles, Calif., assignor to U. S. Electrical Motors, Inc., a corporation of California Application February 19, 1934, Serial No. 711,917

16 Claims. (Cl. 74—230.17)

This invention relates to a power unit and more particularly to a compact arrangement incorporating an electric motor drive, an adjustable speed drive from the motor to a load driving shaft, and a supporting and enclosing housing.

Preferably the variation in speed is obtained by the aid of a pulley structure and a belt, in which the effective diameter of the pulley structure is variable.

In the present instance, the motor shaft is made integral with the driving shaft of the adjustable speed drive. An adjustable pulley structure is mounted on the driving shaft, and this structure is connected by a belt with a similar pulley structure on the driven shaft. Each of the pulley structures includes a pair of pulley sections having opposed inclined faces which are axially adjustable toward and from each other. As the sections move together, a belt, in driving contact with both of the inclined faces, is moved by the sections radially outward, thereby increasing the effective diameter. Conversely a separation of the sections permits the belt to move inwardly, to contact with the faces on a smaller effective diameter.

In order to adjust a belt of constant length to pulleys of variable diameter, the two pulley structures (driving and driven) are arranged to be oppositely adjustable; that is, an increase in the effective diameter of the driven pulley structure is accompanied by a compensating decrease in the effective diameter of the driving pulley structure.

It is one of the objects of this invention to provide an electrically driven source of variable speed power, which in application can replace variable speed electric motors wherein the variation in speed is obtained by a manipulation of the electrical characteristics of the machines.

It is another object of this invention to provide an electrically driven source of variable speed power which can be operated from commercial power lines with the use of only that switching equipment common to general purpose motors.

It is still another object of this invention to provide a portable, compact, enclosed, electrically driven source of variable speed power with a large power capacity per unit of weight and volume.

It is still another object of this invention to combine the functions of the component mechanisms so as to reduce the total number of parts to a minimum.

It is still another object of this invention to provide a power unit in which the orientation of the component parts can be interchanged so that the power unit can be mounted in any desired relation to the driven load.

It is still another object of this invention to provide a safe and compact source of variable speed power having a housing or casing which supports and protects substantially all of the working parts, and that yet permits ready adjustment or replacement of such elements as the electric motor, the pulley structures, or the belt.

It is still another object of this invention to provide a means of maintaining the belt in alignment for all the positions of the adjustable pulley structure.

It is still another object of this invention so to support the working mechanism that no difficult machining operations are necessary in the construction of the housing.

It is still another object of this invention to provide means whereby the same pulley structures may be used with belts of different lengths and widths.

It is still another object of this invention to permit an initial setting of the speed ratio while the motor is at a standstill.

It is still another object of this invention to provide a means whereby the relative position of the movable pulley sections may be adjusted to compensate for belt wear or for variation in the dimensions of individual belts.

It is still another object of this invention to increase the life and power transmission capacity of the belt by providing means for dissipating the heat generated by the internal and surface friction of the belt.

This invention possesses many other advantages, and has other objects which may be made more easily apparent from a consideration of one embodiment of the invention.

For this purpose there is shown a form in the drawings accompanying and forming part of the present specification.

This form will now be described in detail, illustrating the general principles of the invention; but it is to be understood that this detailed description is not to be taken in a limiting sense, since the scope of the invention is best defined by the appended claims.

Referring to the drawings:

Fig. 2 and Fig. 3 are detailed views of the means for interlocking the adjustment of the effective diameters of the driving and driven pulley structures, Fig. 2 being drawn on a larger scale than Fig. 3.

Fig. 4 is a fragmentary horizontal section of the driven shaft of the adjustable pulley mechanism, illustrating the use of gearing between the load driving shaft and the driven shaft and the means by which the auxiliary gear housing is supported.

Fig. 5 and Fig. 6 are plan views illustrating the manner in which the relative position of the component parts can be interchanged.

Fig. 7 and Fig. 8 are vertical sectional views of the motor end of the casing and of the driving pulley structure illustrating the manner in which the heat is dissipated from the belt and pulley surfaces.

Figures 1, 11:
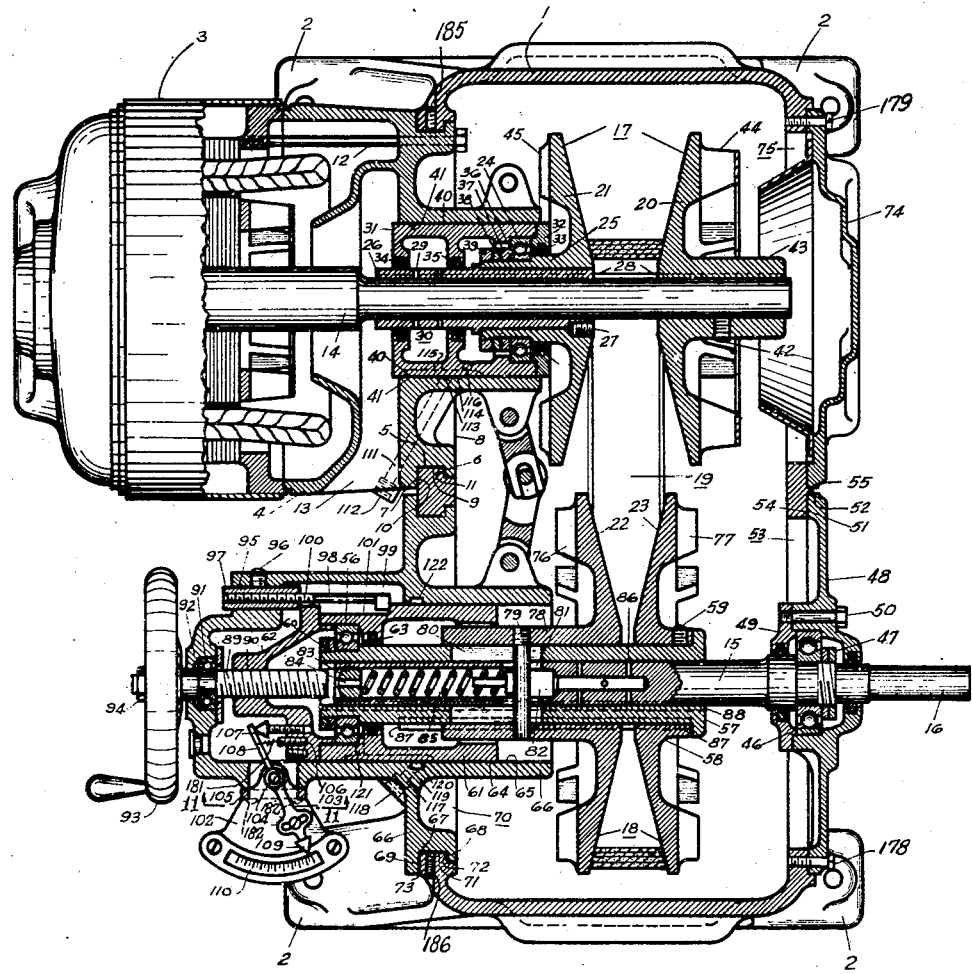
Fig. 1 is a view, mainly in horizontal section of a power unit embodying the invention.
Figures 9, 10:
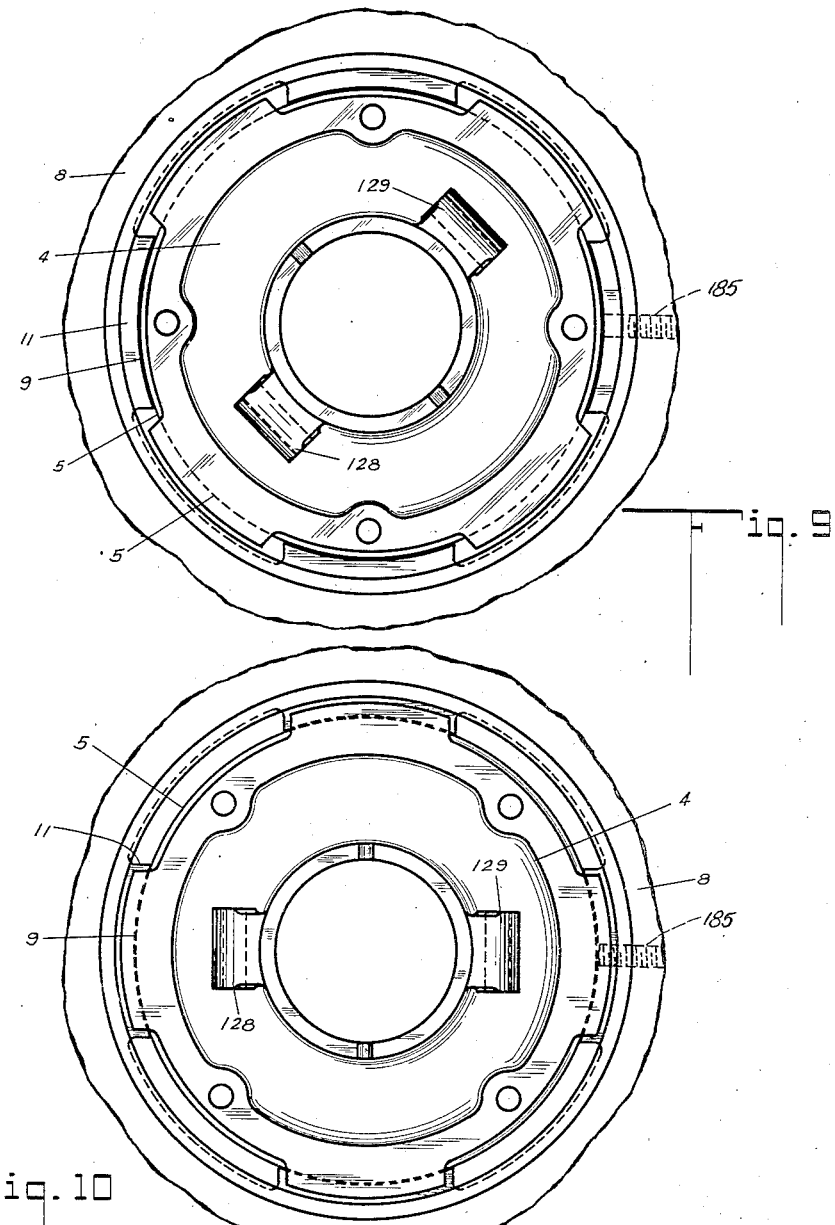

Figs. 9 and 10 are detailed views of the motor supporting means, viewed from the interior of the casing and from the right of the motor of Fig. 1. Fig. 9 shows the relative positions of the motor supporting means and of the casing while the motor supporting means is being entered into the casing. Fig. 10 shows the relative positions after the motor supporting means is brought to its final position.

Fig. 11 is a detail section as seen on plane 11—11 of Fig. 1.

In the present instance a casing 1 is provided, in which substantially all of the operating parts of the device are accommodated. This casing can be provided with appropriate feet, such as 2, by the aid of which it may be fastened to a supporting base.

In order to provide motive power for the unit, an electric motor 3 is supported by the casing. The manner in which motor 3 is supported will now be described.

Motor 3 is shown as being of the enclosed type with a frame which is substantially cylindrical. One bracket of motor 3 is of the usual motor type, the other motor bracket being replaced by motor supporting member 4 (Fig. 1) which has many functions. Member 4 has a cylindrical surface 5 and interrupted flanged surfaces 6 and 7. Frame 1 is provided with an aperture 8 having an interrupted interior cylindrical surface 9 and interrupted flanged surfaces 10 and 11. The interrupted flange 6 of member 4 can be passed through the interrupted cylindrical surface 9 and then rotated until flanges 6 and 11 are in contact and likewise flanges 7 and 10. The cylindrical surface 5 of member 4 is then supported by the cylindrical surface 9 of aperture 8. The contacting surfaces of member 4 and aperture 8 form a support similar to a breechlock, best indicated by Figs. 9 and 10, a set screw 185, or other suitable means being provided to prevent member 4 rotating with respect to the housing.

Fig. 9 shows the position of member 4 when entering aperture 8 of the casing. Member 4 is rotated so that the projecting portions of member 4, on which the interrupted flanged surface 6 is formed, coincide with the openings left in aperture 8 by the interrupted cylindrical surface 9. Member 4 can thus be entered into the casing in this position. In Fig. 10 member 4 is shown rotated into the final position. The projecting portions of member 4, on which interrupted flanged surface 6 is formed, now coincide with the projecting portions of aperture 8, on which the interrupted cylindrical surface 9 and interrupted flanged surfaces 10 and 11 are formed. In this position the surfaces are in contact as shown in Fig. 1.

Motor 3 is then fastened to member 4 in a definite angular position by a suitable means such as bolts 12. The motor is thus firmly and adequately supported by one wall of the casing.

Member 4 can also be provided with one or more air passages such as 13 to the motor, whereby the normal ventilation of the motor may be maintained.

Motor 3 is provided with a shaft 14 which serves as a motor shaft and as the driving shaft of the adjustable pulley mechanism. This shaft can thus be designated as the driving shaft.

A driven shaft 15 has an axis parallel with the axis of shaft 14, and may be appropriately supported as hereinafter described, in casing 1. It may be provided with a load driving extension 16 or the load driving means may be connected with the driven shaft through appropriate gearing.

A pair of adjustable pulley structures, 17 and 18, are supported on shafts 14 and 15 respectively. Each of these pulley structures may include an axially fixed section and an axially adjustable section, each of the sections having opposed inclined belt engaging faces. The pulley structures are connected by a flexible V-belt 19. As the belt is of constant length the arrangement is such that adjustment of the effective diameter of one pulley structure causes a compensating converse adjustment of the effective diameter of the other pulley structure. Thus assuming for example that the right hand section 20 of pulley structure 17 is axially fixed with respect to shaft 14, then the left hand section 21 is arranged to be moved toward and from section 20, respectively, to increase and decrease the pulley diameter. In the corresponding pulley structure 18, the left hand section 22 may be axially fixed, or movable only for adjusting the initial belt tension, for providing means for maintaining the belt in alignment or for taking up wear in the belt, while the right hand section 23 is adjustable toward and from section 22. In this way, as the ratio of transmission is varied, the belt 19 moves in a direction parallel to the axes of the shafts and stays in alignment with both pulley structures.

In the present instance the driving shaft 14 and its associated pulley structure 17 have one bearing 24 which is axially movable with respect to the driving shaft. Bearing 24 is mounted on hub 25 of the movable pulley section 21. Hub 25 is pressed over a bushing 26 of porous self lubricating material such as bearing bronze. Hub 25 may be fixed with respect to bushing 26 by a headless screw 27. Bushing 26 is splined to shaft 14 by means of key 28. The surface of shaft 14 in contact with bushing 26 may be provided with a wear and corrosion resisting coating such as chromium plate or the shaft may be case hardened or otherwise chemically treated to obtain a surface of high mechanical strength or which resists corrosion. Bushing 26 is provided with lubricating apertures 29 through which a lubricant can be supplied from chamber 30 of the bearing housing 31 of bearing 24. The importance of good lubrication between shaft 14 and bushing 26 cannot be overstressed. The movable pulley section 21 must be freely slidable with respect to shaft 14 under all operating conditions.

Bearing 24 is held in bearing housing 31 by means of bearing cap 32. The bearing cap 32 is provided with a lubricant retaining seal 33. Bearing housing 31 is also provided with additional lubricant retaining seals 34 and 35, for retaining lubricant in chamber 30. Pulley hub 25 has an extended cylindrical surface 36 on which bearing 24 is mounted together with spacing rings 37 and 38. Bearing 24 and spacing rings 37 and 38 are held in place by lock nut 39. By means of spacing rings such as 37 and 38 bearing 24 may be mounted at any point within the limits of surface 36. The axial position of bearing 24 with respect to pulley section 21 may be thus varied to accommodate belts of widely different dimensions.

Bearing housing 31 has an exterior surface 40 which is axially slidable with respect to an interior supporting surface 41 of member 4. Bearing housing 31 is thus axially slidable with respect to the driving shaft 14, and also with respect to the motor supporting member 4. Bearing housing 31 has additional means for restricting rotational movement and for adjusting its axial position, which will be described hereafter. It is apparent from the construction that an axial movement of bearing housing 31 results in an equal axial movement of pulley section 21. It is thus possible to adjust the effective diameter of pulley structure 17 by adjusting the axial position of bearing housing 31.

Attention is drawn to the movable pulley section 21 and its associated structure. Bearing 24 serves the triple purpose of supporting the axial load of the driving shaft 14, of transmitting the axial and radial load on pulley section 21 to the bearing housing 31, and that of permitting the relative rotational movement between pulley section 21 and bearing housing 31 with its associated shifting mechanism. Bearing 24 being mounted on pulley hub 25 permits reducing the overhang of pulley structure 17 beyond its support, and thus permits a reduction of the bending moment on the shaft and the resultant deflection. By mounting bearing 24 on hub 25, bushing 26 can be made of sufficient length to reduce the load per unit area to the value consistent with the materials employed.

To maintain a lubricated surface between shaft 14 and bushing 26 presents a difficult problem. Although there is no relative rotational movement between the two parts, there is a combined rolling and sliding action because these two parts are not integrally joined but have instead a slight sliding clearance. For each revolution of the motor, shaft 14 rolls a distance inside of bushing 26 equal to the circumference of the shaft and slides a distance equal to the difference in circumference of the interior of the bushing and of the shaft. This rolling action quickly works the lubricant out from between the contacting surfaces.

Although there is a slight relative sliding action, the difference in the circumference of the bushing and of the shaft is so small that a portion of the shaft surface always comes in contact with the same portion of the bushing surface. Commercially it is not practical to form true cylindrical surfaces. The bushing and shaft will actually come into contact only at the projecting portions of their surfaces. If there were a considerable sliding action, these projecting surfaces would be quickly worn down until the contact would be quite evenly distributed. In the absence of such motion the compression stress between the surfaces remains localized. The rolling and pounding action of the bushing on the shaft produces local heating at the points of highest stress. If this stress is too great for the material a rapid corrosion takes place unless the material is corrosion resisting. A scale is formed on the contacting surface, which binds the shaft inside of the bushing. This binding may be so tight at times, that a gear puller or a press is required for pulling the bushing off the shaft. It is obvious that the whole speed adjusting mechanism is rendered inoperative unless the axially movable pulley sections are maintained freely slidable.

The present construction permits a solution of the problem. The wear and corrosion resisting surface of shaft 14 acts to prevent seizure of the contacting surfaces. By making bushing 26 of a porous, lubricant retaining material, a supply of lubricant is retained at the contacting surfaces. Such lubricant retaining materials, however, are not capable of withstanding large unit stresses. It therefore becomes necessary to so modify the construction that a large contacting surface is available. This is provided in the present construction by providing a long bushing 26.

Bearing housing 31 is also constructed to permit a free sliding action between surface 40 and the supporting surface 41 of member 4. By the present construction this surface can be made of sufficient axial length and area to reduce the unit stress to a very low value. This permits the use of lubricants which have a low viscosity at all operating temperatures.

The fixed pulley section 20 may also be splined to key 28 on the driving shaft 14. The axial position of section 20 may be fixed by means of set screws 42 attached to hub 43 of pulley section 20.

Both sections of pulley structure 17 have fans, on the outside surfaces, which may be made integral with the pulley sections. Pulley section 20 has a fan 44 and pulley section 21 has a fan 45. The action of the fans will be described hereafter.

In the present instance the driven shaft 15 has two supporting bearings. One bearing 46 is fixed with respect to the shaft and also with respect to the frame 1. Fixed bearing 46 is held on shaft 15 by lock nuts 47. Bearing 46 is supported by a bearing housing in flanged plate 48 which is in turn secured to frame 1, as by bolts 178. Bearing 46 is held in place by plate 48 and by bearing cap 49. Bearing cap 49 may be secured to plate 48 by screws 50. Driven shaft 15 is thus held in axial position by bearing 46.

The manner in which plate 48 is supported by frame 1 is of importance. In many applications the load driving shaft is connected to the driven shaft through gearing. Plate 48 is then replaced by an auxiliary gear housing which must be mounted in the same relation to frame 1 as the plate which it replaces.

Plate 48 has a flanged surface 51 in a plane perpendicular to the axis of the driven shaft 15 and a cylindrical surface 52 with its axis concentric with the axis of shaft 15. Case 1 is provided with an aperture 53 which has a flanged surface 54 perpendicular to the axis of the driven shaft and an interior cylindrical surface 55 concentric with the axis of the driven shaft. The cylindrical surface 52 of the plate 48 is centered inside of cylindrical surface 55 of frame 1. These two surfaces carry the radial load of bearing 46. The axial position of plate 48 is fixed by the contact of flanged surfaces 51 and 54.

The other bearing 56 of the driven shaft is axially movable with respect to shaft 15. Bearing 56 is mounted on bushing 57 which is pressed into hub 58 of the movable pulley section 23. Bushing 57 may be fixed to hub 58 by set screws 59. Bushing 57 must be freely slidable with respect to shaft 15 for the same reasons that were pointed out with respect to bushing 26 on the driving shaft. For this purpose shaft 15 may be provided with a wear and corrosion resisting surface similar to that of driving shaft 14. Bushing 57 may be made out of bearing bronze or some similar porous lubricant-retaining material. Bearing 56 may be held in place by lock nut 60. Bearing 56 is mounted inside of bearing housing 61 and may be fixed in the housing by bearing cap 62. Housing 61 has a lubricant-retaining seal 63 adjacent to bearing 56. Bearing housing 61 has an exterior surface 64 which is axially slidable with respect to an interior supporting surface 65 on control housing 66.

It is apparent from the construction that an axial movement of bearing housing 61 results in an equal and similar movement of pulley section 23. It is thus possible to adjust the effective diameter of pulley structure 18 by adjusting the axial position of bearing housing 61. The manner in which the adjustment of the driving and driven pulley structures 17 and 18 are interlocked will be described hereafter.

Attention is drawn to the triple purpose of bearing 56. The radial load of the driven shaft, and a combined axial and radial load of pulley structure 18 is transmitted by bearing 56 to the supporting means. Bearing 56 also permits the relative rotational movement between bearing housing 61 and the movable pulley section 23.

Control housing 66 has an exterior cylindrical surface 67 and interrupted flanged surfaces 68 and 69 whereby the control housing is supported in an aperture 70 in the wall of casing 1. Aperture 70 has an interrupted interior cylindrical surface 71 and interrupted flanged surfaces 72 and 73. The cylindrical surface 67 of the control housing is supported by interior cylindrical surface 71, and is held against axial movement by the contact of flanged surfaces 68 and 69 with flanged surfaces 72 and 73 respectively. The dimensions of the supporting surfaces of control housing 66 are equivalent to those of the motor supporting member 4; likewise the dimensions of the supporting surfaces of aperture 70 are equivalent to those of aperture 8. A set screw 186 or other suitable means may be provided to prevent relative rotation of the parts, as before.

A ventilating cover 74 is provided for casing 1 adjacent to the end of the driving shaft, being secured in place as by bolts 179. Cover 74 has supporting surfaces equivalent to those of the bearing supporting plate 48. Casing 1 is provided with an aperture 75 which supports ventilating cover 74. The supporting surfaces of aperture 75 are equivalent in every respect to those of aperture 53. From the symmetrical construction of casing 1 it is apparent that the driving shaft and its associated structure may be interchanged in position with the driven shaft and its associated structure. This symmetry of casing 1 is an important feature because it enables the variable speed drive to be mounted in any desired relation to the driven load. Fig. 5 and Fig. 6 are plan views illustrating the manner in which the relative positions of the component parts may be interchanged.

To make this interchange in position of the driving and driven shafts no new parts are required. The motor and the driving pulley structure are symmetrical about a vertical plane so that they can be mounted at either end of the casing with equal facility. Flanged plate 48 of the driven pulley structure can be used in either end of the case. Control housing 66 is symmetrical about a horizontal plane. It can be mounted at either end of the casing by a rotation through 180 degrees.

Attention is drawn to the manner in which the driving and driven shafts are supported by casing 1. The surfaces of apertures 8 and 75 are either parallel or concentric. The apertures are of sufficient size to permit these surfaces to be machined at a single setting of casing 1, either on a boring mill or on a lathe. The measurements required are only those of diameters or distances between parallel faces. These measurements can be taken quickly and accurately. Likewise the surfaces of apertures 53 and 70 can be machined at a second setting of casing 1. From the nature of the connection between the driving shaft and the driven shaft, which is a flexible belt, it is not necessary to maintain the center distance between the two shafts nor the angle between the shafts to close tolerances. It is thus possible to use very simple fixtures for holding casing 1 during the machining operations. It is, however, necessary to maintain the tolerances to close limits between the structures on either the driven or driving shafts and the bearing supports. By the nature of the present construction these tolerances can be readily maintained.

The manner in which casing 1 is constructed is also of particular utility in that apertures 8, 53, 70 and 75 may be made of relatively large size. The motor together with its associated pulley structure may be assembled as a unit and entered into the casing through aperture 8. Aperture 75 provides convenient access to the belt and pulley structure. The relative position of the pulley sections of the driving pulley structure may be readily adjusted or pulley section 20 will, in many cases, be sufficiently small in diameter so that it may be removed through aperture 75 to provide convenient access to the belt for adjustment or replacement.

The driven pulley structure is supported by plate 48 and by control housing 66. Plate 48 may be removed from the casing giving access to the driven pulley structure and to the belt. By removing plate 48 the belt may be passed over the driven pulley structure and over the end of the driven shaft. This in combination with the removable ventilating cover 74 provides an extremely rapid means for replacing the belt or for adjusting and aligning the pulley structures. In some instances it may be convenient to remove both plate 48 and control housing 66 from their supporting apertures. In such instances the belt can obviously be replaced with extreme ease. In many instances the driven pulley structure will have a diameter less than that of aperture 70 which supports control housing 66. In such cases, control housing 66 together with the driven shaft and pulley structure may be entered or removed from the casing as a unit.

The top of casing 1 is provided with a removable cover 173, secured in place as by machine screws 180, and best shown in Figs. 7 and 8. This cover permits access to the adjusting means of the pulley structures and for general inspection of the enclosed mechanism.

The manner in which the driven shaft may be supported by the frame has been disclosed. Attention is now drawn to the remaining structures associated with the driven shaft.

Both sections of pulley structure 18 have fans on the outside surface which may be made integral with the pulley sections. Pulley section 22 has a fan 76 and pulley section 23 has a fan 77. The action of the fans will be described hereafter.

Pulley section 22 has a hub 78 which is axially slidable over bushing 57. Hub 78 has a pin 79 extending through a slot 80 in bushing 57 and through slot 81 in driven shaft 15. The driven shaft 15 has a hollow chamber 82 provided at one end with a screw plug 83. Screw plug 83 is provided with a lubricant hole 84. A compression spring 85 is mounted in chamber 82 with one end pressing against plug 83 and the other end pressing against pin 79. The pressure of spring 84 is transferred by pin 79 to pulley section 22, which in turn transmits the force to belt 19. The axial force on the edge of the belt can be thus adjusted by using springs of different strength for spring 85, and by varying the pressure exerted by individual springs by adjusting the position of screw plug 83. Lubricating apertures 86 are provided in driven shaft 15 connecting chamber 82 with bushing 57.

Bushing 57 is splined to hub 78 by key 87 and to shaft 15 by key 88.

Hub 78 must be maintained freely slidable with respect to bushing 57 for the same reasons that were pointed out with regard to the other axially movable pulley sections. For this purpose the contacting surfaces of hub 78 may consist of a wear and corrosion resisting coating deposited or formed on a supporting surface of the hub.

The lubricating chambers and passages of the driven pulley structure are of particular utility in that they are formed at a radius smaller than that of the surfaces which must be lubricated. The rotation of the shaft and of the lubricant produces a centrifugal force urging the lubricant between the contacting surfaces.

If it is desired, pulley section 22 may be fixed to driven shaft 15 without means for axial movement. However, in that case it is necessary to adjust the initial belt tension or compensate for belt wear by manually adjusting the axial position of pulley section 20. By the use of spring 85 it is possible to maintain a constant axial force on the belt for all positions of the adjustable diameter pulleys and also to maintain an essentially constant axial force on the belt in spite of elongation or wear of the belt.

By a proper construction of the means for interlocking the axial adjustments of the two pulley structures, spring 85 can also serve as a means for maintaining the belt in alignment. This feature of the construction will be described hereinafter.

The use of spring 85 and the structure associated with pulley section 22 permits an initial adjustment of the speed ratio while the pulley structure is at standstill. In many applications where it is necessary to accelerate masses which acquire a large momentum it is desirable to reduce the force required for the acceleration to a minimum. If the speed ratio can be adjusted at standstill to the point where the speed of the driven shaft is a minimum, the force required for the acceleration will also be a minimum. With the angles commonly used for the conical pulley faces, the forces at the edge of the belt fall within the cone of friction. It is thus impossible to produce any radial motion of the belt over the conical pulley face unless the pulleys are in rotation. By the present construction the bearing housing 61 may be moved, at standstill, in the direction to increase the effective diameter of the driven pulley. Inasmuch as the belt is unable to move over the pulley face, pulley sections 23 and 22 move toward the left as a unit. Pin 79 moves along slot 81 to compress spring 85. When the motor is started, spring 85 forces pin 79 and pulley section 22 toward the right, forcing the belt radially outward to the position determined by the initial setting of the speed control mechanism. This action takes place very quickly during the first few revolutions of the motor. It is thus possible to start loads which acquire a large momentum without high accelerating forces.

Bearing housing 61 may be moved axially by lead screw 89 which engages an internal thread 90 of bearing cap 62. Lead screw 89 is held in fixed axial position and rotatably supported by bearing 91 secured in bearing housing 92 on control housing 66. Lead screw 89 is provided with a hand wheel 93 which is keyed to screw 89 by suitable means and is held on lead screw 89 by lock nuts 94. By a rotation of the hand wheel the lead screw can move the bearing housing 61 and its associated pulley section 23 to any desired position within the limits of the mechanism. As the position of pulley section 23 is interlocked with that of the pulley section 21, the speed ratio can be varied in the manner previously described by rotating handwheel 93.

The pulley structure of the driven shaft has now been described. As has been previously mentioned, when the driven pulley structure has an external diameter less than that of aperture 70, the entire assembly of the driven shaft may be entered into the casing as a unit. In instances where the diameter of the driven pulley structure is larger than aperture 70, it is still possible to assemble pulley sections 22 and 23 together with bearing housing 61 as a unit and to enter the unit into the casing through the bottom of the casing, which is entirely open, as shown in Figs. 7 and 8. The pulley structure can then be mounted on the driven shaft by passing the driven shaft into the casing through aperture 53.

In order to adjust the limiting positions of the movable pulley sections to accommodate various widths and lengths of belts an adjustable stop is provided for limiting the movement of the speed adjusting mechanism. Control housing 66 has an aperture 95 and set screw 96. A bushing 97 having an internal thread may be fixed in any desired position inside of aperture 95 by means of set screw 96.

A rod 98 having an offset wide head 99 and a threaded portion 100 is held in axial position by bushing 97. The threaded portion 100 of rod 98 engages the internal thread of bushing 97. Bearing housing 61 is provided with a groove 101, on its exterior surface, into which head 99 of rod 98 projects. The movement to the right of bearing housing 61 is limited by the contact of bearing cap 62 with head 99. The movement to the left of bearing housing 61 is limited by the contact of bearing cap 62 with bushing 97. The construction permits the ready axial adjustment of both rod 98 and bushing 97. Rod 98 can be rotated to the angular position where bearing cap 62 does not contact head 99. Rod 98 is set in this position during the assembly of the unit.

It is desirable to indicate the setting of the speed ratio adjusting mechanism. For this purpose a speed indicator 102 is provided. A pointer 103 having a pivot 104 supported by base 105 secured to control housing 66, as by screws 182, is actuated by the position of bearing cap 62. Bearing cap 62 is provided with several tapped holes 106, to accommodate different belts. A pin 107 may be threaded a desired distance into the correct hole 106. The head of pin 107 bears against projection 108 of pointer 103. Any suitable yielding means such as a spring 181 may be used to maintain projection 108 in contact with pin 107. Pointer 103 is provided with an adjustable pointing head 109. The speed of the driven shaft, corresponding to the setting of the speed control mechanism and to the motor speed is indicated by the position of the pointing head 109 on a suitable graduated scale 110. The use of this speed indicating mechanism is of particular utility with motors whose speed is essentially constant.

When the positions of the driving and driven shafts are interchanged in casing 1, control housing 66 is rotated through 180 degrees. Speed indicator base 105 may then be removed and replaced in an inverted position to bring speed indicator 102 to the correct position with respect to the power unit.

Inasmuch as the reading of the speed indicator is determined by the position of the speed control mechanism it is possible to determine before starting the motor at what speed the driven shaft will operate when the motor reaches full speed. This ability to determine beforehand the operating speed is of particular utility when it is required to start loads which acquire a large momentum. By the present construction it is possible to adjust the speed control mechanism, at standstill, to the position at which the speed of the driven shaft will be a minimum. By means of the speed indicator it is possible to determine what adjustment is necessary before starting the motor and during the normal operation of the variable speed power unit.

The manner in which the axially movable structures on the driving and driven shafts are constructed, the importance of maintaining good lubrication for the contacting surfaces, and the manner in which the parts cooperate to assure good lubrication have all been disclosed. It is, however, necessary to provide means for renewing the supply of lubricating material. The surfaces to which the lubricant must be supplied are not readily accessible. It is therefore desirable to provide a construction such that the supply of lubricant can be quickly and conveniently replenished without interrupting the operation of the machine and without danger to the operator.

Appropriate lubrication can be provided for the contacting surfaces between sleeve 26 and shaft 14 by passing lubricant to chamber 30. Similarly, lubricant can also be passed to the chamber around bearing 24. Although in some instances different types of lubricant for these two uses may be desirable (in which case separate lubricators would be provided), ordinarily a common lubricant for both purposes is satisfactory. One way of supplying lubricant will now be described.

In the present instance motor supporting member 4 is provided with an aperture 111, extending from a surface outside of casing 1 to the bearing housing supporting surface 41. The accessible end 112 of aperture 111 may be tapped to accommodate any convenient lubricating fixture such as those commonly employed with pressure lubricators. The interior end 113 of aperture 111 terminates in a groove 114 on the exterior surface 40 of bearing housing 41. Groove 114 is connected by aperture 115 with lubricating chamber 30 and by aperture 116 with bearing 24. The manner in which the lubricant is supplied from chamber 30 to the contacting surfaces has already been disclosed.

Control housing 66 is provided with a lubricating aperture 117, with exterior end 118, and interior end 119, terminating in groove 120 on the exterior surface 64 of bearing housing 61. Groove 120 is connected by aperture 121 with the interior of bearing housing 61. The manner in which the lubricant then reaches the contacting surfaces is apparent from the construction and the previous disclosure. A circular groove 122 may be provided on interior surface 65 of control housing 66, whereby lubricant can be supplied between surfaces 64 and 65.

Lubricating apertures 111 and 117 have their exterior ends 112 and 118 in an accessible location where it is possible to inject a lubricant directly or by means of tubing leading to a remote reservoir.

The construction of the entire variable speed power unit is such that a free operation of the speed adjusting mechanism is assured under all operating conditions. The lubricating passages are built into the members which they lubricate. The interior of the casing is not obstructed by any lubricant conducting tubing or other lubricating fixtures which prevent ready access to the belt or pulleys for adjustment or replacement.

The means by which the movable pulley sections 21 and 23 are adjusted axially has already been disclosed. In the present instance the position of bearing housing 31 is interlocked with that of bearing housing 61 by means of the lever system shown in Figs. 2 and 3. Bearing housing 31 is provided with two radially extending pins 123. Motor supporting member 4 is provided with two slots 124 which permit and guide the axial movement of bearing housing 31 and the attached pins 123. Pins 123 are engaged by the slotted ends 125 of forked lever 126. Lever 126 pivots about pin 127 which is mounted on an extending ear 128 on member 4. Member 4 is provided with a similar ear 129 which may be used when the positions of the driving and driven shafts are interchanged in the casing.

A common pivot pin 130 is engaged by slotted end 131 of lever 126 and by apertures 132 of forked lever 133. Lever 133 is pivoted about pin 134 which is engaged by apertures 135 of lever 133. Pin 134 is mounted on an extending ear 136 on control housing 66. Bearing housing 61 is provided with pins 137 which are axially movable in slots 138 on control housing 66. Pins 137 are engaged by slotted ends 139 of forked lever 133.

By means of the lever system shown, an axial movement of bearing housing 61 in one direction results in a simultaneous axial movement of bearing housing 31 in the same direction. However, bearing housings 61 and 31 are attached to opposite facing pulley sections 23 and 21. The movement produced is thus precisely that required for compensating the change in the effective diameters of the pulley structures.

In Figs. 2 and 3 the lever arm of pin 130 about pivot pin 134 is shown greater than the lever arm of pin 130 about pivot pin 127. The lever arm of pin 137 about pivot pin 134 is shown equal to that of pin 123 about pivot pin 127. It is thus evident that with the construction shown the axial movement of bearing housing 31 and pulley section 21 is greater than the axial movement of bearing housing 61 and pulley section 23. Depending on the relative diameters of the driving and driven pulley structures, the axial movement of the adjustable pulley section of the driving pulley structure may be made greater or less than that of the driven pulley structure, by the use of suitable values for the four lever arms of the interlocking system.

Where relatively high speed electric motors are used it is advantageous to make the maximum value of the diameter of the driven pulley structure greater than that of the driving pulley structure. The relative axial adjustment of the driven pulley structure should consequently be less than that of the driving pulley structure.

The construction permits the positive and accurate adjustment of the effective diameters of both the driving and driven pulley structures.

The positions of levers 126 and 133 are interlocked by pivot pin 130. Pivot pin 130 is provided with two eccentric contacting surfaces 140 and 141. Surface 140 contacts apertures 132 of lever 133. Surface 141 contacts slot 131 of lever 126. A rotation of pin 130 about its axis produces a cam like shifting of the relative position of levers 126 and 133. This in turn produces a simultaneous shift in the relative positions of pulley sections 21 and 23. Pulley sections 21 and 23 may be made to approach each other or to separate by rotating pin 130. The relative position of pulley sections 21 and 23 may be thus adjusted by rotating pin 130 to the required position. The pulley sections may then be locked in this relative position by locking the pin 130. Pin 130 is provided with a slotted head 142 to assist in rotating the pin. Lever 133 is provided with a set screw 143 for locking pin 130 in position.

By this construction the relative position of the movable pulley sections 21 and 23 may be adjusted over a wide range to accommodate belts of different widths and lengths and to compensate for elongation and wear of the belt.

By the use of spacing rings 37 and 38 the position of pulley section 21 may be changed to accommodate belts of different dimensions. By means of pin 130 and the associated structure it is possible to adjust for variation in the dimensions of individual belts or pulleys, and for belt wear.

The construction provides three pulley sections 21, 22 and 23 which are all relatively adjustable. This is the least number of relatively adjustable pulley sections required if the belt is to be maintained in alignment under all conditions of operation. The construction also permits the accurate alignment of the pulley structure on the driven shaft with that of the driving shaft in spite of large variations in the relative location of the driving and driven shafts in the casing. The manner in which the relative position of pulley sections 21 and 23 may be adjusted has been disclosed. If pulley section 22 is axially fixed, the alignment of the belt must be effected by a careful setting of the axial position of pulley section 20. By the present construction, pulley section 22 is self-aligning in response to the belt dimensions and the positions of the remaining pulley sections.

Where a motor is driven from a constant frequency, alternating current, source of power, the number of available motor speeds is limited. For each motor speed the dimensions of the belt, pulleys, and case have certain optimum values which determine the range of speeds which can be obtained economically at the driven shaft. The speed range required at the load driving shaft is, however, a function of the connected load and not of the source of power. It is therefore advantageous to so construct the variable speed unit that gearing may be readily interposed between the load driving shaft and the driven shaft of the variable speed drive. It is of particular utility to so incorporate the gearing in the variable speed power unit that a unit may be assembled with or without gearing by the interchange of a minimum number of parts.

Fig. 4 shows a sectional view of the driven shaft of the variable speed drive with gearing interposed between the load driving shaft and the driven shaft. In this instance the driven shaft 15 of Fig. 1 is replaced by the driven shaft 144 of Fig. 4. Shaft 144 has an axially fixed bearing 145 secured in a bearing housing 146 in a wall of auxiliary gear housing 147. Bearing 145 is held in place by spacing ring 148 and bearing cap 149. Bearing cap 149 is provided with a lubricant retaining seal 150.

A driving gear 151 is secured to and supported by the driven shaft 144. Driving gear 151 may be provided with a shank 152 which may be secured in a hollow chamber 153 in the end of the driven shaft 144. Bearing 145 is held on shaft 144 by a spacing ring 154 interposed between driving gear 151 and bearing 145. If the driving gear has a sufficiently large diameter it may be mounted directly on a gear supporting extension of shaft 144.

Driving gear 151 engages driven gear 155 mounted on load driving shaft 156. Load driving shaft 156 is provided with a load driving extension 157 projecting outside of gear housing 147. Load driving shaft 156 is supported by bearings 158 and 159. Bearing 158 is supported by a bearing housing 160 in a wall of the gear housing 147. Bearing 159 is supported by a bearing housing 161 in cover 162 of the gear housing.

Cover 162 is provided with a flanged surface 163 and an exterior cylindrical surface 164 concentric with the axis of the load driving shaft. Gear housing 147 is provided with a flanged surface 165 and an interior cylindrical surface 166 with its axis concentric with that of the load driving shaft. Cover 162 is located with respect to the gear housing by the contact of flanged surfaces 163 and 165 and by the peripheral contact of exterior cylindrical surface 164 with interior cylindrical surface 166, and is secured in place as by bolts 184. Cylindrical surfaces 164 and 166 need only be in contact for an angle slightly greater than 180 degrees. Inasmuch as a lubricant must be supplied for the gears, the contact of flanged surfaces 163 and 165 also serves to seal the lubricant in the gear housing. Gear case cover 162 is provided with a lubricant-retaining seal 167 to prevent the lubricant from escaping along the load driving shaft.

Gear case 147 is provided with a flanged surface 168 in a plane perpendicular to the axis of the driven shaft 144 and with an exterior cylindrical surface 169 concentric with the axis of shaft 144.

Gear case 147 is supported by surfaces 54 and 55 of aperture 53 of housing 1 which have been previously described, bolts 183 serving to secure it in place. The axial position of gear case 147 is fixed by the contact of flanged surfaces 168 and 54. Gear case 147 is radially supported by the contact of cylindrical surfaces 169 and 55.

A ventilating opening 170 may be provided in the auxiliary gear case for assisting in the ventilation of casing 1.

Gear case 147 and flanged plate 48, Fig. 1, are fully interchangeable with respect to the supporting surfaces of aperture 53. Driven shaft 144 may be identical with driven shaft 15, Fig. 1, except for the differences noted.

By this construction it is thus possible to assemble a unit with or without gearing by the simple interchange of flanged plate 48 and driven shaft 15 of Fig. 1 with the gear assembly and driven shaft 144 of Fig. 4.

The manner in which the auxiliary gear housing is supported by case 1 is of particular utility in that, by removing bolts 183, the gear housing may be rotated upon cylindrical surface 55 around the axis of the driven shaft 144 to any desired angular position as determined by the holes provided for the bolts. The load driving shaft 156 may thus be readily located in a large number of positions with respect to case 1. This in turn allows the variable speed power unit to be located in as many positions with respect to the driven load.

The construction also assures an accurate alignment of the gears. The concentricity of apertures 53 and 70 of case 1, and the perpendicular relation of surface 54 to the axis of the cylindrical surface 55 is assured by the manner in which these surfaces may be machined.

The supporting surfaces 168 and 169 of gear case 147 and of bearing housing 146 may be machined at a single setting of the auxiliary gear housing 147 in a boring mill or lathe. The concentricity of cylindrical surface 169 with bearing housing 146 and the perpendicular relation of flanged surface 168 to the axis of the cylindrical surface 169 is thus assured.

The cover supporting surfaces 165 and 166 and bearing housing 160 may all be machined at a second setting of the gear case in a boring mill or lathe. For this purpose gear case 147 may be held in a jig which locates surfaces 165 and 166 in correct relation to surfaces 168 and 169.

Surfaces 163 and 164 and bearing housing 161 may all be machined at one setting of the gear case cover in a lathe, thus assuring the correct relative location of these surfaces.

The axes of the driving and driven gears are maintained parallel and at the correct center distance by the nature of the construction itself. The gear case and gearing may be freely disassembled for inspection or replacement with the positive assurance that all the component parts may be reassembled in their correct relative positions.

The provision of fans 44, 45, 76 and 77 on the exterior surfaces of pulley sections 20, 21, 22, and 23 has already been noted. Fig. 7 is a sectional view of the motor end of the casing and of the driving pulley structure illustrating the manner in which the heat is dissipated from the belt and pulley surfaces. Fig. 8 is a sectional view of the casing in a plane perpendicular to the axis of the driving shaft.

In the present instance case 1 is provided with a removable ventilating cover plate 74 which may be provided with downward facing openings such as 171 and an air deflector 172.

The rotation of fan 44 of pulley section 20 produces a decreased pressure inside air deflector 172. Air is drawn into the casing through opening 171 and is directed toward fan 44 by the deflector. The air passes radially outward over the exterior surface of pulley section 20 into the interior space of casing 1.

A removable ventilating cover 173 with downward facing openings 174 is provided for casing 1, screws 180 serving to secure it in place. Additional air passages 175 may be provided between the base and the bottom of the walls of the casing. Louvres 176 may also be placed in the walls of the casing as shown in Fig. 8. Air may thus be discharged from the casing by ventilating openings 174, 175 and 176 and by ventilating openings 170 of the auxiliary gear housing of Fig. 4.

The ventilating openings of Figs. 7 and 8 all have downward facing openings. The unit can thus be exposed to falling liquid without the possibility of the liquid entering the casing.

In some installations it may be desirable to provide screens such as 177 (Fig. 7) over the ventilating openings to prevent the entrance of foreign objects into the casing.

The normal motor ventilation is maintained by ventilating passage 13 of the motor supporting member 4. By this construction separate ventilation may be provided for the motor and for the casing. The materials available for the insulation of the motor are such that they are able to successfully withstand much higher temperatures than the driving belt in the casing which is subject to a continuous mechanical deformation.

It is of particular utility to place fans on the exterior surfaces of the pulley sections. The fans produce a circulation of air over the exterior surface of the pulley section thereby cooling that surface. The heat is thus carried from the pulley section to the air enclosed in the housing. The heat may then be dissipated from the housing by exhausting the heated air to the outside of the casing or the heat may be conducted from the air to the walls of the casing and then may be dissipated from the exterior surface of the casing to the surrounding atmosphere.

When a belt, with pulley engaging sides, is operated without any enclosing casing, the temperature of the belt and pulley faces is increased, but slightly over that of the surrounding medium. The heat, generated by the internal friction of the belt and by the surface friction of the edges of the belt against the pulley faces, is readily dissipated.

At a constant temperature, the rate of power dissipation per unit volume by the internal friction of the belt varies directly as the frequency of the stress cycle and as the square of the maximum stress.

When no enclosing casing is required the construction generally used results in low stress values and in a small value for the surface friction loss. The diameters of the pulleys and the distance between the pulley centers are relatively large. The belt tension and the lateral pressure of the pulley faces on the belt are small.

When a belt is bent, the strain produced is directly proportional to the change in curvature. Each time a belt passes over a pulley it is bent from a straight line to the radius of the pulley and is then unwound again to form a straight line. For this stress cycle the total change in curvature is inversely proportional to the pulley radius. The use of large diameter pulleys thus results in a small value for the internal belt friction. A long distance between the pulley centers results in a low frequency for the stress cycle. The rate of heat generation and the resultant rise in temperature are thus small when no enclosing casing is required.

The construction of a portable, compact, enclosed, variable speed power unit results in limitations which are not readily apparent. The pulley diameters and the distance between pulley centers must be reduced to a minimum. A maximum value of belt tension and belt velocity must be used to maintain a large power transmission capacity. In order to obtain a wide variation in speed ratio with a belt of moderate width, it is necessary to use a small included angle between the pulley faces. This results in a large lateral pressure on the belt and in an increased wiping action of the belt over the pulley faces when entering and leaving the pulley structure.

A high belt velocity in combination with small pulley diameters and a short distance between pulley centers results in a high frequency for the stress cycle and in large stress values. The increased belt tension produces large lateral compression force on the belt which results in large internal friction losses and in a high value for the surface friction between the belt edges and the pulley faces, thus the power per unit volume which is dissipated by the internal and surface friction of the belt results in a high rate of heat generation.

In addition to a higher rate of heat generation the means for removing the heat from the belt is greately impaired. The temperature of the belt and of the pulley faces in contact with the belt will be greatly increased unless means are provided for rapidly removing the heat from these surfaces.

The materials available for belt construction are such that the stress resisting properties are greatly influenced by temperature. The safe stress, determined by the fatigue limit, decreases rapidly for only a small increase in temperature above the normal ambient value. The values which may be successfully employed for the pulley diameters, the belt velocity, the belt thickness, the belt tension, and all the other dimensions which determine the stresses and the rate of heat generation by the belt are thus a function of the belt temperature. These dimensions are the very ones which determine the power transmission capacity of the variable speed power unit. In this manner the belt temperature becomes a limiting factor for the entire construction.

This important relation between the belt temperature and the power transmission capacity has not been appreciated. The fatigue limit of a belt subject to a stress cycle is greatly lowered by temperatures which apparently produce no detrimental effect to similar materials not subject to a stress cycle. Moreover, the region of heat generation is concentrated in the belt and at the contacting pulley surfaces. The resultant temperature of the belt may thus be very high without producing an alarmingly high temperature rise on the exterior surfaces of the casing. By placing the fans on the exterior surface of the pulley sections a constant stream of air is provided for removing the heat generated by the belt. The temperature of the belt and of the pulleys can be maintained at a value but slightly greater than that of the air in the casing.

By providing means for ventilating the casing, the temperature of the air inside and outside of the casing may be held at substantially the same value.

In installations subject to acid fumes or other destructive agents or where there is danger of explosion, it may be desirable to seal the casing entirely. Under such circumstances the fans on the pulley sections are of particular utility, in that the air has its greatest velocity adjacent to the pulley surface. In this manner the thickness of the film of air which clings to the pulley surface is reduced to a minimum. Thus the rate of heat transfer from the generating area to the cooling medium is greatly increased. The air in turn transfers the heat to the walls of the casing thereby providing a comparatively large surface for dissipating the heat to the surrounding medium. The present construction permits the transfer of heat to the exterior of the casing with a minimum of power consumption by the cooling means and therefore with a minimum of additional heat generation.

A high belt temperature, in addition to decreasing the stress resisting property of the belt, increases the frictional losses of the belt. When the stress in a material subject to a stress cycle approaches the fatigue limit the rate of heat generation by the stress cycle is greatly increased. The heating of the belt thus produces a cumulative effect which results in the rapid destruction of the belt.

The materials available for belt construction are such that when they become heated they produce an adhesive film on the pulley surface. When a belt enters and leaves a pulley it sweeps across a portion of the pulley face. If this surface is coated with an adhesive film, the frictional losses are increased and in addition a violent vibration of the belt is produced.

The construction described provides means for increasing the life and power transmission capacity of the belt which thereby enables the construction of a portable, compact, enclosed source of variable speed power with a high power capacity per unit of weight and volume.

I claim:

1. In an enclosed variable speed power unit, an electric motor having a shaft, said shaft forming the driving shaft of said variable speed power unit, an adjustable pulley structure mounted on said driving shaft, a driven shaft, an adjustable pulley structure mounted on said driven shaft, a belt in active driving relation to said pulley structures, a casing enclosing said belt and pulley structures, said casing providing a degree of enclosure sufficient to prevent the inadvertent entrance of foreign objects, a load driving means operated by the driven shaft and projecting outside of said casing, and means, joining the motor and the casing, for supporting the motor on the casing, said means having a ventilating passageway for the motor.

2. In an enclosed adjustable speed power unit, a driving shaft and a driven shaft, an adjustable pulley structure in axial driving relation to each of said shafts, each of said pulley structures including a pair of pulley sections having opposed inclined belt engaging faces, forming by relative axial adjustment variable effective pulley diameters, a belt in active driving relation to said pulley structures, a casing enclosing said belt and pulley structures, said casing including walls and a top, means cooperating with said casing for rotatably supporting said shafts, means for positively adjusting the axial positions of opposite facing pulley sections of the driving and driven shafts, means for positively interlocking the axially adjusting means of said pulley sections, and means for positively adjusting the relative position of one of said axially adjusting means with respect to said interlocking means, said last named means including an element having an eccentric formed thereon, whereby a rotation of said element results in said adjustment.

3. In an adjustable speed power unit, an adjustable pulley structure, said adjustable pulley structure including a pair of pulley sections having opposed inclined belt engaging faces, forming by relative axial adjustment variable effective pulley diameters, a shaft in axial driving relation to said pulley structure, means for adjusting the axial positions of one of said pulley sections and means carried by said one section for varying the relative position of said section with respect to the axial adjusting means.

4. In a variable speed drive, a driving shaft and a driven shaft, a driving motor in active driving relation to said driving shaft, an adjustable pulley structure in axial driving relation to each of said shafts, a belt in active driving relation to said pulley structures, means for adjusting the effective diameter of at least one of said pulley structures, a frame, and means for supporting said driving motor, said adjusting means, and said driving and driven shafts on said frame, said supporting means providing means whereby the positions of said driving and driven shafts together with their respective pulley structures, as well as of the driving motor and adjusting means, may be interchanged with respect to the frame.

5. In an adjustable speed drive, means forming an adjustable ratio power transmission, said adjustable ratio power transmission including a driving shaft, a driving pulley structure mounted on said driving shaft, a driven shaft, a driven pulley structure mounted on said driven shaft, and a belt for transmitting power between said pulley structures, at least one of said pulley structures having an adjustable effective diameter, a housing enclosing said transmission, said housing having a pair of opposed walls, each of said walls having a pair of apertures formed therein, each of said apertures being in alinement with an axis of the drive, and means forming a removable cover for each of said apertures, at least one of said apertures formed in each of said walls providing substantial access to the interior of said housing, upon the removal of the respective cover.

6. The structure as set forth in claim 5, with the addition of means forming an auxiliary gear housing, and means for supporting said auxiliary gear housing on one of said removable covers.

7. In an enclosed electrically driven variable speed power unit, a driving shaft and a driven shaft, an electric motor including a stator and a rotor, said rotor being in axial driving relation to said driving shaft, a pair of adjustable pulley structures in respective axial driving relation to each of said shafts, a belt in active driving relation to said adjustable pulley structures, a casing enclosing said belt and pulley structures, a load driving means projecting outside of said casing and actuated by said driven shaft, means cooperating with said stator and said casing whereby the motor may be supported by one wall of said casing, and bearing means for rotatably supporting said driving shaft, said motor supporting means providing a support for said bearing means and having a ventilating passage formed therein for the motor ventilation.

8. In a variable speed power unit, a driving shaft, a driven shaft, pulley structures respectively in axial driving relation to said shafts, at least one of said pulley structures having an adjustable effective diameter, a belt in active driving relation to said pulley structures, a casing enclosing the belt and the pulley structures, means whereby a source of power may drive said driving shaft, an auxiliary housing supported by a wall of the casing and adjacent the driven shaft, bearing means for rotatably supporting said driven shaft and supported by the housing, and gearing means in said housing in power transmitting relation to said driven shaft, said gearing means having a load driving shaft extension projecting out of the auxiliary housing, said load driving shaft extension having an axis spaced from that of the driven shaft, said auxiliary housing being angularly adjustable about the axis of the driven shaft.

9. In a variable ratio transmission, a shaft, an adjustable pulley structure in axial driving relation to said shaft, said pulley structure having a pair of sections with opposed inclined faces, forming by relative axial adjustment, variable effective pulley diameters, bearing means for rotatably supporting said shaft, a non-rotating support for the bearing means, said support being axially adjustable, one of said pulley sections being axially adjustable on the shaft and slidable thereon by axial movement of said support, there being a continuous passage from the non-rotating support to the contacting surfaces between the shaft and the said one of said sections, said support being provided with a communicating passageway for the ingress of lubricant to the continuous passage.

10. In a variable ratio transmission, a pair of shafts, a pair of pulley structures respectively mounted on said shafts, each of said pulley structures having a pair of sections with opposed inclined belt engaging faces forming by relative axial adjustment, variable effective pulley diameters, a belt engaging both of said structures, and positive means for simultaneously axially adjusting one section of one structure and one section of the other structure, for increasing one pulley diameter and decreasing the other pulley diameter, comprising a pair of interlocked levers, respectively associated with said adjustable sections, one lever having a different leverage from the other.

11. In a variable ratio transmission, a pair of shafts, a pair of pulley structures respectively mounted on said shafts, each of said pulley structures having a pair of sections with opposed inclined belt engaging faces forming by relative axial adjustment, variable effective pulley diameters, a belt engaging both of said structures, positive means for simultaneously axially adjusting one section of one structure and one section of the other structure, for increasing one pulley diameter and decreasing the other pulley diameter, comprising a mechanism imparting a greater movement to one of said adjustable sections than to the other of said adjustable sections, and resilient means for urging one of the other sections toward its companion section.

12. In a variable ratio transmission, a pair of shafts, a pair of pulley structures respectively mounted on said shafts, each of said pulley structures having a pair of sections with opposed inclined belt engaging faces forming by relative axial adjustment, variable effective pulley diameters, a belt engaging both of said structures, positive means for simultaneously axially adjusting one section of one structure and one section of the other structure, for increasing one pulley diameter and decreasing the other pulley diameter, comprising a pair of interlocked levers, respectively associated with said adjustable sections, one lever having a different leverage from the other, and resilient means for urging one of the other sections toward its companion section.

13. In a variable ratio transmission, a driving shaft, a driven shaft, a pair of pulley structures respectively in axial driving relation to said shafts, at least one of said pulley structures having a pair of relatively axially adjustable sections with opposed inclined faces, forming by relative axial adjustment, variable effective pulley diameters, a frame for supporting said structures and the shafts, bearing structures associated with each shaft, and means detachable from the frame for supporting said bearing structures thereon, said frame having supporting surfaces respectively for said detachable bearing supporting means, and said bearing supporting means having corresponding dimensions, whereby the driving and driven shafts, with their associated pulley structures and bearing supports, may be interchanged in position with respect to said frame.

14. In a variable ratio transmission, a driving shaft, a driven shaft, a pair of pulley structures respectively in axial driving relation to said shafts, at least one of said pulley structures having a pair of relatively axially adjustable sections with opposed inclined faces, forming by relative axial adjustment, variable effective pulley diameters, a casing for supporting said structures and the shafts, there being a pair of apertures in said casing respectively adjacent the shafts, a cover member for each of said apertures detachably secured to the casing, a bearing structure associated with the driven shaft, one of said cover members including means for supporting said bearing structure, said casing having supporting surfaces for said covers, and said covers having corresponding dimensions, whereby the driven shaft, with its associated pulley structure and bearing may be optionally supported in either of said apertures.

15. In a variable ratio transmission, a driving shaft, a driven shaft, a pair of pulley structures respectively in axial driving relation to said shafts, at least one of said pulley structures having a pair of relatively axially adjustable sections with opposed inclined faces, forming by relative axial adjustment, variable effective pulley diameters, a casing for supporting said structures and the shafts, a source of power in driving relationship with said driving shaft and having a frame bearing structure associated with each shaft, said frame being arranged to support the bearing structures associated with the driving shaft, speed adjusting mechanism associated with the driven pulley structure and having a housing, said housing serving to support a bearing structure associated with the driven shaft, said casing having supporting surfaces respectively for said frame and said housing, and said frame and said housing having corresponding dimensions, whereby the driving shaft, together with its associated pulley structure and source of power, may be interchanged in position with the driven shaft together with its associated pulley structure and speed adjusting mechanism, with respect to said casing.

16. In a variable ratio transmission, a driving shaft, a driven shaft, a pair of pulley structures respectively in axial driving relation to said shafts, at least one of said pulley structures having a pair of relatively axially adjustable sections with opposed inclined faces, forming by relative axial adjustment, variable effective pulley diameters, a casing for supporting said structures and the shafts, said casing having a pair of opposed walls, a source of power in driving relationship with said driving shaft and having a frame, bearing structures associated with each shaft, said frame forming the sole support for the bearing structures associated with the driving shaft, speed adjusting mechanism associated with the driven pulley structure and having a housing, said housing serving to support a bearing structure associated with the driven shaft, one wall of said casing having supporting surfaces respectively for said frame and said housing, said frame and said housing having corresponding dimensions, the other wall of said casing having a pair of apertures respectively adjacent the shafts, a cover member for each of said apertures detachably secured to the casing, a second bearing structure associated with the driven shaft, one of said cover members including means for supporting said bearing structure, said other wall of the casing having supporting surfaces for said covers, said covers having corresponding dimensions, whereby the driving shaft together with its associated pulley structure and source of power may be interchanged in position with the driven shaft, together with its associated pulley structure and speed adjusting mechanism, with respect to said casing.

DON HEYER.